Dec. 8, 1931.                R. C. SANDERS ET AL                1,835,575
                               RUBBER BUSHING
                             Filed Feb. 27, 1929

Inventors
Rufus C. Sanders
Caleb E. Summers
By Blackmore, Spencer & Hick
Attorneys Patented Dec. 8, 1931

1,835,575

UNITED STATES PATENT OFFICE

RUFUS C. SANDERS, OF DETROIT, AND CALEB E. SUMMERS, OF PONTIAC, MICHIGAN, ASSIGNORS TO GENERAL MOTORS CORPORATION, OF DETROIT, MICHIGAN, A CORPORATION OF DELAWARE

RUBBER BUSHING

Application filed February 27, 1929. Serial No. 343,123.

This invention relates to flexible connections or cushioning devices, and is especially adapted for use in connection with spring shackles for motor vehicles, engine mountings, body supports and the like.

The invention contemplates the use of rubber or other similar material for the purpose of cushioning and absorbing shock and according to the present embodiment, a bushing unit is assembled with a rubber sleeve interposed and held under an initial pressure between the inner and outer concentric members. The inner member is provided with a series of longitudinal or axial ribs and a circumferential groove midway of the ribs and the rubber sleeved on the inner member is placed under considerable pressure by the compression of the outer member, which is originally cylindrical, but which is deformed under pressure to provide longitudinal ribs opposite the depressions between the ribs of the inner member. The initial deformation of the rubber, besides increasing the life of the material, takes away its excessive responsiveness to deformation. The rubber fills up the space between the inner and outer members, and flows into the groove and on opposite sides of the ribs, and the ribs on the respective members projecting into the body of the rubber cooperate to deform the rubber between adjacent ribs upon relative turning movement of the members, so that a yielding resistance is offered to the relative movement. The projection of the rubber into the circumferential groove serves to resist relative axial movement of the parts.

While its field of usefulness is not limited, the unit will be found to be especially adaptable for shackle connections between a motor vehicle chassis and its suspension spring, and for the present purposes it will be referred to in this connection. As embodied in a pivot joint, the elastic bushing insulates the relatively movable metal parts from each other, thereby eliminating frictional contact and the resultant wear and avoids all necessity for lubrication. Furthermore, it cushions noise and road shocks and combines at least some of the effects of the conventional shock absorber or snubber with a rubber spring shackle which snubbing action is obtained by reason of the torsional resistance of the rubber bushing. Because of the resistance to axial movement, side sway is effectually overcome.

The invention will be better understood upon reference to the accompanying drawings wherein Fig. 1 is a fragmentary side elevation of a shackle connection between a chassis frame and load-supporting spring.

Figure 1:
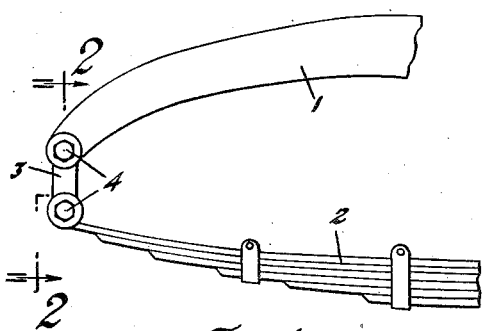
Figure 2:
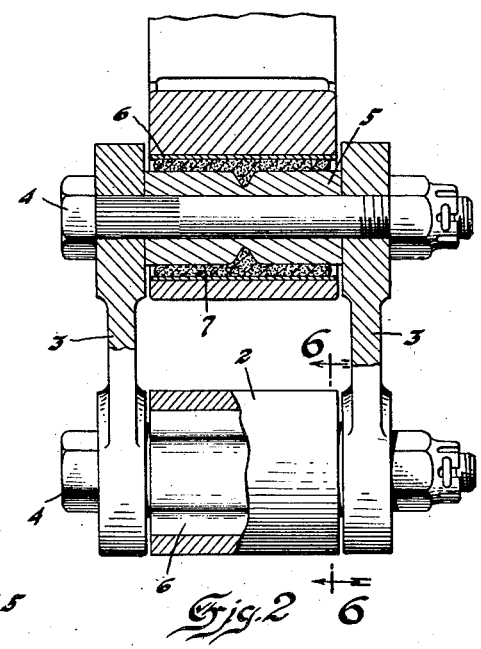
Fig. 2 is a sectional view taken on line 2—2 of Fig. 1.

Referring to the drawings, the numeral 1 indicates a longitudinally extending side member of a chassis frame and 2 is a multiple leaf load-supporting spring, the ends of the frame member and spring being connected by a pair of swinging shackle links 3 and the pins or studs 4. Ordinarily the shackle bolts 4 pass through metal bushings secured within eyes formed by an opening in the frame bracket or by curling over the end of the main spring leaf. In lieu of a metal bushing, it is proposed in the present instance to substitute the rubber bushing unit, which consists of an inner member or core 5, an outer member or sleeve 6, and an intermediate bushing or body 7 of rubber or other similar elastic deformable substance. The sleeve 6 may have a pressed fit in the eye of either the frame bracket or spring, as the case may be, to hold it against movement relative thereto, and the core 5 is held against movement relative to the swinging shackle links 3, preferably by providing the bolt 4 with a knurled or serrated portion that fits tightly into the opening in one of the shackle links and the inner or core member 5. On the outside of the inner member 5 are a series of longitudinal or axial ribs or beads 8 which have a transverse notch or opening 10 intermediate their ends, thereby providing a circumferential groove or open space dividing each rib into two sections aligned one with the other. The elastic block 7 fits on either side of the ribs 8 and into the intermediate open space and the outer member 6 is provided with a series of longitudinal axial ribs or beads 9 that project into the body of the elastic block 7 at points intermediate the succeeding ribs 8. Thus upon tendency for the inner and outer member to turn relative to each other, ribs 8 and 9 will cooperate one with the other to compress the intermediate body of rubber, whereby the elasticity of the rubber serves to cushion and yieldingly resist such movement. It will be understood that the bushing unit may be employed either in the upper end of the shackle links, or at their lower end, or at both ends, dependent upon conditions of use.

Figure 3:
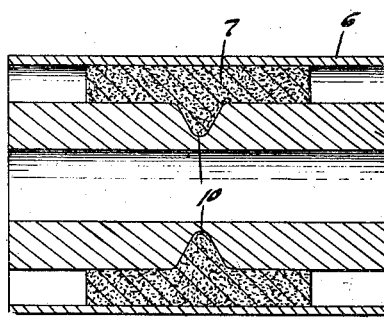
Fig. 3 is a detailed sectional view illustrating one of the steps in the method of assembling the unit.
Figure 4:
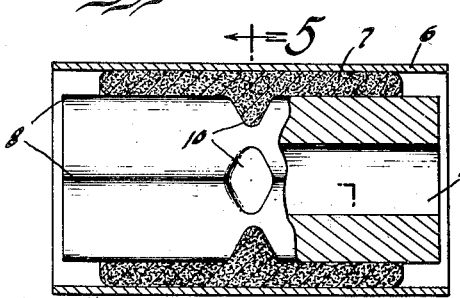
Fig. 4 is a similar sectional view illustrating another step in the process of assembly.
Figure 5:
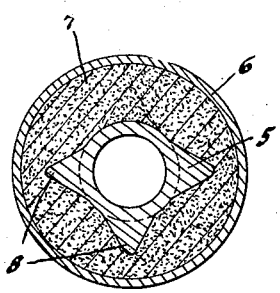
Fig. 5 is a transverse sectional view on line 5—5 of Fig. 4
Figure 6:
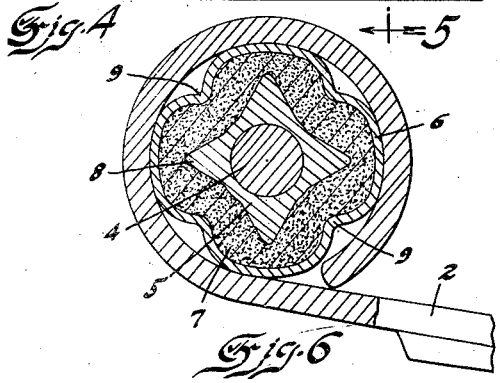
Fig. 6 is a sectional view taken on line 6—6 of Fig. 2 and also illustrates the final assembly form of the unit.

In assembling the bushing unit the rubber or other substance is fitted upon the inner member 5 which has been preformed to the proper shape and then the outer member 6 is placed about the rubber. This outer member, which is originally cylindrical in shape and may consist of seamless tubing, is then subjected to pressure to reduce its diameter and place the rubber sleeve 7 under considerable initial pressure. These two steps in the manufacture will be clearly seen by a comparison of Figs. 3 and 4. The wall of the outer member 6 is subsequently subjected to additional pressure, along predetermined lines to distort or bend the same inwardly, so as to form the axial ribs or beads 9 that project into the body of the elastic sleeve opposite the depressions between the succeeding ribs 8.

In the event this bushing unit is to be utilized as a resilient mounting for engines, either the inner or outer member may be secured to a frame bracket and then the other member is fastened to the engine. In this case the elasticity of the sleeve 7 will free the engine from various road shocks and it also absorbs and damps out the inherent vibration incident to the operation of most engines, and which is usually of small amplitude and high frequency, and prevents the transmission of such vibration through the chassis frame and so avoids induced sympathetic vibrations in the various associated parts and the imposition of disagreeable sensations on the nervous systems of the occupants of the motor car.

Although the invention has been described more or less specifically it is not limited to the exact details shown and described, and various modifications may be made, such as come within the scope of the appended claims.

I claim:

1. A device of the character described comprising an inner member having a series of axial ribs and a depression in each rib intermediate its ends, a bushing of elastic deformable material surrounding the inner member and having portions thereof extending between said ribs and into said depressions and an outer sheet metal member surrounding said bushing in radially contracted form to hold the bushing under initial pressure and having portions thereof distorted along longitudinal lines to present inwardly extending beads that project into the body of said bushing at points intermediate the ribs on said inner member.

2. A device of the character described, including an inner member having a peripheral longitudinal rib, a depression in each rib, a bushing of elastic deformable material on said member on either side of said rib and projecting into said depressions, and an outer sheet metal member radially compressed about the bushing and provided with an inwardly formed longitudinal rib extending into the body of the bushing, said bushing being held under pressure between said members by reason of the compression and deformation of the outer member and being adapted to cushion relative movement thereof.

3. A device of the character described including relatively movable spaced inner and outer members having cooperating axial ribs at least one of which is of sheet metal, the ribs of each member projecting toward the other member, and being arranged in alternate relation with the ribs of the other member, and the ribs of one of the members having notches therein intermediate their length thereby breaking the continuity thereof and the ribs of the other member being constituted by the deformation of the sheet metal thereof along axially projecting lines, and elastic deformable material interposed and held under pressure between said members and adapted for deformation to cushion the relative movement of the members.

4. A device of the character described, including an inner member having an axial rib provided with a transverse depression intermediate its ends, a body of elastic deformable material having portions on either side of said rib and within said depression, and an outer sheet metal member movable relative to the inner member and being compressed radially thereof at assembly to cooperate with the inner member to hold said elastic deformable material under pressure, the deformation of said material between the members permitting the relative movement of the members.

5. A device of the character described, including an inner member having a series of axial ribs which extend from adjacent the ends to an intermediate point, the ribs to one side of the intermediate point being spaced from those on the other side to afford a transverse opening therebetween, a sleeve of elastic deformable material on said inner member extending on opposite sides of the ribs and into said opening between axially spaced ribs, and an outer sheet metal member surrounding said sleeve and having portions thereof deformed inwardly along axially extended lines to provide ribs that project into the body of said sleeve between succeeding ribs of the inner member.

6. A device of the character described, including relatively movable concentric members at least one of which is formed of sheet metal tubing, each having axial ribs projecting toward the other member, with the ribs of one member alternately arranged with those of the other, and the ribs of one member being constituted by the deformation of portions of its sheet metal wall along axially extending lines, circumferentially spaced from each other, and the ribs of the other member being arranged in pairs, with the ribs of each pair axially spaced from and aligned with each other, and a bushing of elastic material interposed and held under pressure between the members and conforming to the adjacent irregular surfaces afforded by the arrangement of said ribs, whereby the relative movement is yieldingly resisted and cushioned by the deformation of the bushing between the members.

7. The method of making a resilient joint which includes providing an inner member with a series of axial ribs, each of which has a transverse notch, surrounding said member with a bushing of elastic deformable material for projection between said ribs and into said notches, surrounding said bushing with a sleeve, then contracting said sleeve to place the bushing under pressure and thereafter bending the material of the sleeve inwardly to form axial ribs that project into the body of the bushing in alternate relation with the ribs on the inner member.

8. The method of making a resilient joint which includes providing an inner member with a series of axial ribs, each of which has a transverse notch therein, inserting said member in a bushing of elastic deformable material, surrounding said bushing with a sleeve, contacting said sleeve to compress the bushing and distorting the sleeve under pressure to form a series of ribs that extend into the body of the bushing and between succeeding ribs on said inner member.

9. The method of making a resilient joint which includes providing an inner member with a series of axial ribs, surrounding said member with an elastic deformable bushing, sleeving the bushing with an outer sheet metal member, and then deforming the outer sheet metal member along axially extending lines in circumferential spaced relation to form a series of inwardly projecting ribs alternately arranged with the ribs of the inner member.

10. The method of making a resilient joint which includes the inter-position of an elastic bushing between inner and outer members, at least one of which is of a workable material, and the deformation of the workable material of one member along an axially extending line to provide an axial rib on the member for projection into the elastic bushing.

11. The method of making a resilient joint which includes interposing a rubber bushing between a pair of concentric members, one of which has a preformed axial rib, and then deforming a portion of the other member along an axial line to form an axial rib that projects into the rubber bushing in cooperative relation with the rib of the other member.

12. The method of making a resilient joint which includes interposing an elastic deformable material between a pair of relatively movable members and then deforming one of the members to provide a longitudinal rib for projection into the elastic deformable material.

In testimony whereof we affix our signatures.

RUFUS C. SANDERS.
CALEB E. SUMMERS.